(12) United States Patent
Molteni et al.

(10) Patent No.: US 12,095,261 B2
(45) Date of Patent: Sep. 17, 2024

(54) ELECTRIC POWER SUPPLY APPARATUS AND METHOD IN AN INDUSTRIAL PLANT

(71) Applicant: DANIELI AUTOMATION S.P.A., Buttrio (IT)

(72) Inventors: Roberto Molteni, Tradate (IT); Antonello Mordeglia, Bangkok (TH)

(73) Assignee: DANIELI AUTOMATION S.P.A., Buttrio (IT)

( * ) Notice: Subject to any disclaimer, the term of this patent is extended or adjusted under 35 U.S.C. 154(b) by 24 days.

(21) Appl. No.: 17/926,323

(22) PCT Filed: May 20, 2021

(86) PCT No.: PCT/IT2021/050151
§ 371 (c)(1),
(2) Date: Nov. 18, 2022

(87) PCT Pub. No.: WO2021/234751
PCT Pub. Date: Nov. 25, 2021

(65) Prior Publication Data
US 2023/0318290 A1    Oct. 5, 2023

(30) Foreign Application Priority Data
May 21, 2020    (IT) .................. 102020000011923

(51) Int. Cl.
  *H02J 1/10*    (2006.01)
  *H02J 3/38*    (2006.01)
  *H02J 9/06*    (2006.01)

(52) U.S. Cl.
  CPC ............. *H02J 1/102* (2013.01); *H02J 3/381* (2013.01); *H02J 9/06* (2013.01); *H02J 2300/10* (2020.01); *H02J 2300/24* (2020.01)

(58) Field of Classification Search
  CPC .... H02J 1/102; H02J 3/381; H02J 9/06; H02J 2300/10; H02J 2300/24
  See application file for complete search history.

(56) References Cited

U.S. PATENT DOCUMENTS

2003/0102675 A1\* 6/2003 Noethlichs ............. F03D 9/257
                                                      290/44
2009/0273240 A1   11/2009 Gurunathan
(Continued)

FOREIGN PATENT DOCUMENTS

CN         2741308 Y     11/2005
CN       208675572 U      3/2019
(Continued)

OTHER PUBLICATIONS

International Preliminary Report of Patentability for corresponding application PCT/IT2021/050152 filed May 20, 2021; Mail date Jun. 2, 2022.

(Continued)

*Primary Examiner* — Jared Fureman
*Assistant Examiner* — Duc M Pham
(74) *Attorney, Agent, or Firm* — CANTOR COLBURN LLP

(57) ABSTRACT

Electric power supply apparatus in an industrial plant (20) for treating materials, wherein the plant (20) comprises one or more lines (11, 21) for treating the materials and one or more user devices (17, 18, 19) powered with alternating current by power supply means (13) comprising at least one transformer (14) connected to a mains power network (15) and a power supply system (16) located downstream of the transformer (14).

10 Claims, 1 Drawing Sheet

(56) References Cited

U.S. PATENT DOCUMENTS

2011/0273022 A1   11/2011  Dennis
2012/0267952 A1*  10/2012  Ballatine .................. H02J 7/34
                                                         307/26

FOREIGN PATENT DOCUMENTS

| DE | 202008012031 U1 | 1/2009 |
| EP | 3361595 A1 | 8/2018 |
| WO | 2016094939 A1 | 6/2016 |
| WO | 2019207609 A1 | 10/2019 |
| WO | 2019207611 A1 | 10/2019 |

OTHER PUBLICATIONS

International Search Report for corresponding application PCT/IT2021/050151 filed May 20, 2021; Mail date Aug. 31, 2021.
International Search Report for corresponding application PCT/IT2021/050152 filed May 20, 2021; Mail date Sep. 13, 2021.

* cited by examiner

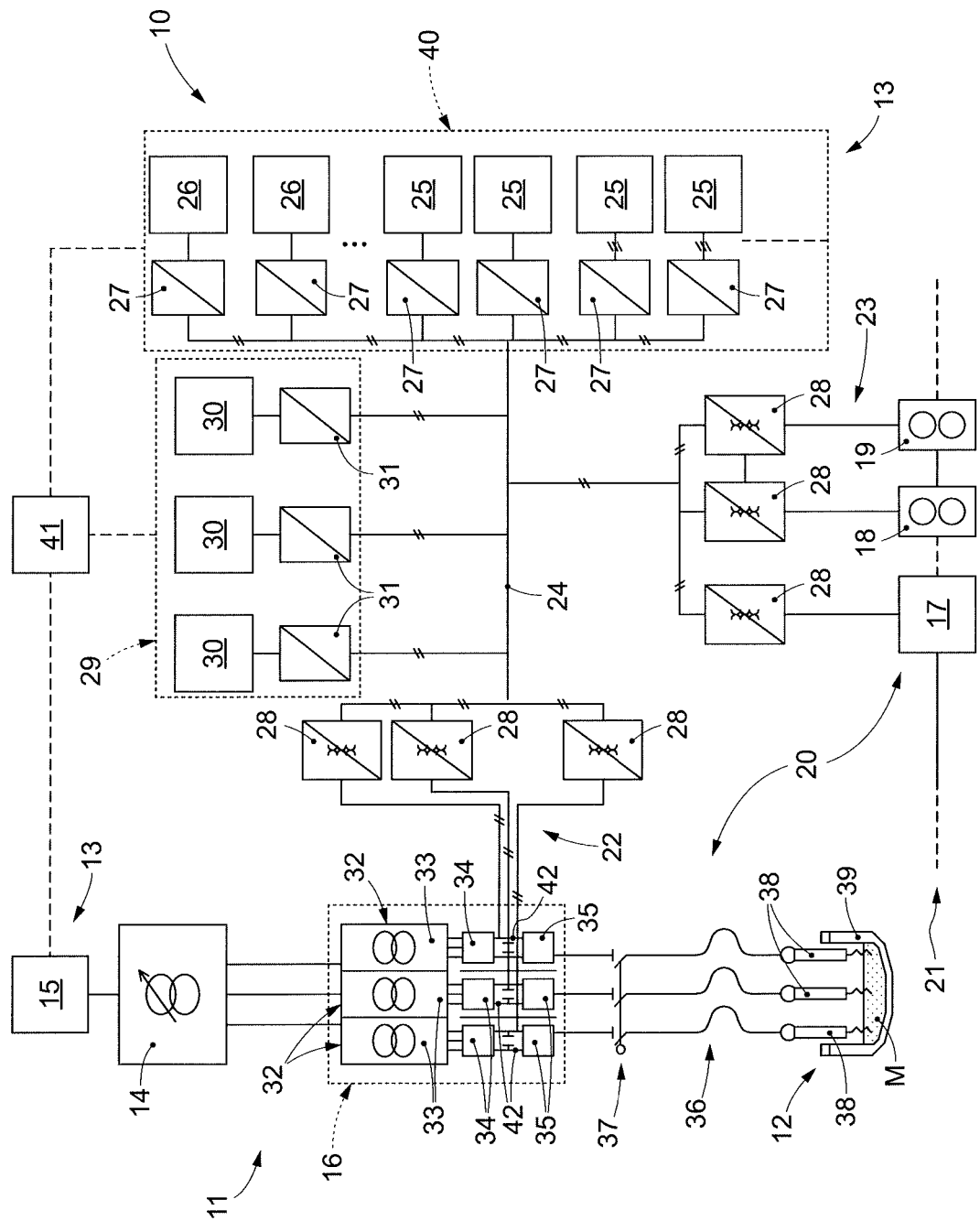

ELECTRIC POWER SUPPLY APPARATUS AND METHOD IN AN INDUSTRIAL PLANT

FIELD OF THE INVENTION

The present invention concerns an electric power supply apparatus in an industrial plant. In particular, the plant can be an industrial plant to treat metal material. An example of an industrial plant of this type is a steel plant comprising at least one line for melting metal material and at least one line for rolling metal material.

The present invention also concerns a method to electrically power an industrial plant for treating materials.

BACKGROUND OF THE INVENTION

As is known, there are various plants for treating materials, for example industrial plants for treating metals, plastics, waste, glass materials, inert materials in general or other, which require energy consumption in the order of megawatts (MW) or tens of megawatts for the functioning of the various user devices and the various lines for treating the materials. Some examples of user devices that consume large amounts of energy can be pumps, fans, aspirators, mixers, heaters, compressors, lifting devices, air conditioning devices, heating furnaces, water heating devices, drying stations or others.

The following description will refer in particular to the case of a steel plant as an example of an industrial plant for treating materials, in this case metal materials, but this description could equally refer to any industrial plant for treating materials.

As is known, a steel plant normally consists of at least one line for melting metal material, provided with at least one melting furnace, for example an electric arc furnace or an induction melting furnace, a casting line and at least one rolling line, where the metal material obtained by melting is sent to be rolled. Normally the melting line also provides a refining furnace and possibly stations for treating the liquid metal in a vacuum.

The rolling line can receive the molten material from a process of continuous casting of the metal material, which passes from a ladle to a mold and then to a rollerway that transfers the metal material to rolling stands, provided with motorized rolling rolls, or toward accumulation beds.

Downstream of the rollerway and upstream of the rolling stands, the rolling line generally comprises one or more heating furnaces, for example induction furnaces, suitable to evenly heat the metal material coming from the continuous casting line, or from external beds, before it is rolled.

Both in the melting line and also in the rolling line, there are various user devices that absorb high quantities of electrical energy (in the order of tens of Megawatts/hour), for example the melting and refining furnaces, the means to drive the rolls of the rolling stands, the heating furnaces, the rollerways to transfer the metal material, and others.

These treatment plants are therefore continuously connected to the mains power network and the absorption of three-phase alternating electric current is a function of production, so the greater the melted material produced by the furnace, the greater the quantity of electrical energy to be purchased, with the risk that the inconstant electrical energy supply can generate disturbances in the network which have to be compensated for by means of suitable inductors which are demanding from an economic point of view, in order to avoid incurring penalties. Another disadvantage is that the use of electrical energy can be expensive, particularly in some geographical areas, or it can become expensive following significant socio-economic events, also considerably increasing the supply costs.

Several steel plants are therefore forced, for example, to concentrate production during periods in which the electrical energy supplied by the mains power network has a lower cost, for example at night.

Furthermore, in the event of a possible black-out of the mains power network, it is necessary to stop the plant and production, with consequent loss of productivity and therefore delays in the delivery of production batches.

WO2016/094939A1 describes a power supply system and method, in particular for use in a data center, which provides to use different power supply sources. The system comprises a first and a second rectifier, each of which is connected respectively to an electrical network and to an auxiliary power source, and an energy accumulation device connected to the outputs of the two rectifiers and an inverter connected between the outputs of the rectifiers and the load, or the data management center. This system provides to eliminate any transition devices between the different power sources.

Document US2009/0273240A1 describes an electric power supply system comprising an electrical network, an alternative power source and a fuel cell system, which are connected by means of respective converters and inverters to a load.

Document US2011/273022A1 describes a method and apparatus to control a hybrid power system provided with several power supply sources connected to a load.

Document EP3046201A1 describes a drive system for a motor powered with different sources of electric power.

There is therefore a need to perfect an electric power supply apparatus in a plant for treating materials which can overcome at least one of the disadvantages of the state of the art.

In particular, one purpose of the present invention is to provide an electric power supply apparatus in a plant for treating materials which can function at least partly independently of the mains power network, so as to reduce the energy supply costs and therefore overall production costs.

One purpose is also to reduce the risk of shutdown of processing or treatment plants due to black-out phenomena on the mains power network, which in the most serious cases can last even several days.

Another purpose is to reduce the use of energy from the public mains power network, reducing the consumption effected on this network and possible disturbances.

Another purpose is to perfect a method to electrically power a plant for treating materials, which allows to limit the use of electrical energy from the mains power network.

It is also a purpose to allow the plant for treating materials to function during the entire day and/or night.

Another benefit and advantage provided by the present invention is also that it allows to reduce $CO_2$ emissions, or other related emissions, if the production of energy by the public network is not completely generated by renewable energy sources.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the present invention concerns an electric power supply apparatus for an industrial plant for treating materials, wherein the plant comprises one or more lines for treating materials and one or more user devices powered in alternating current by power supply means comprising at least one transformer connected to a mains power network and a power supply system located downstream of the transformer.

According to one aspect of the invention, the electric power supply means also comprise at least one alternative power source provided upstream of the power supply system and able to supply power energy to the one or more lines for treating materials and/or to the one or more user devices in addition, or as an alternative, to the electrical energy supplied by the mains power network, in particular a public mains power network.

Thanks to this apparatus and to the alternative energy source it is possible to at least partly power the one or more lines and/or the one or more user devices of the plant independently from the mains power network, and possibly allow an at least temporary disconnection of the lines and/or the user devices from the mains power network, or in any case reduce the supply of energy from the mains power network as a function of the time of day, possibly limiting it to the times of the day when it is less expensive.

Furthermore, the presence of the alternative energy source allows to be able to use the treatment plant even in the event of malfunctions or blackouts of the mains power network.

This plant can be, as a non-limiting example, a steel plant and comprise at least one line for melting metal material and at least one rolling line, wherein the melting line is provided with at least one furnace and the rolling line comprises one or several user devices.

According to one aspect of the present invention, the apparatus comprises a management unit configured to monitor one or more parameters between the functioning status, the quality, the quantity and/or the cost of the electrical energy available from the mains power network and from the at least one alternative energy source, and the quantity of energy required by the one or more lines and/or by the one or more user devices.

One advantage is to be able to maintain the operation of the high-power load, for example in the event of lower availability of energy from the at least one alternative energy source, or in the event of a black-out on the public mains power network.

Advantageously, the management unit can detect one or more parameters between availability of energy supplied by the networks, energy costs, and extent of the integration with the energy available from the at least one alternative energy source in order to cover the energy requirement of the plant.

In this way, it is possible to choose on each occasion the most appropriate supply energy source, that is, the energy supplied by the mains power network, or the energy supplied by the at least one alternative energy source, also on the basis of energy costs. This therefore prevents having to reduce production, or shut down the treatment plant, in cases of energy shortage, or excessive cost thereof.

According to another aspect of the invention, the alternative energy source can be connected to the furnace by means of at least one direct current connection system.

In particular, the direct current connection system is connected upstream of the power supply system with respect to the direction of the electric current toward the furnace.

According to some embodiments, the power supply system is connected between the transformer and the furnace, and comprises at least one medium voltage/medium voltage, or medium voltage/low voltage transformer, a rectifier connected to the transformer and a converter connected to the rectifier by means of a direct current intermediate connection circuit, for example a so-called "DC-Link", able to accumulate and filter the electrical energy and able to guarantee a better reliability and quality of the power supply to the converter.

According to some embodiments, the alternative energy source can be connected to the one or more user devices of the rolling line by means of at least one direct current connection system.

The direct current connection systems, which can be located respectively between the alternative energy source and the melting furnace and between the alternative energy source and the user devices of the rolling line, can be associated with at least one direct current common connection bus.

The present apparatus can comprise one or more high frequency converters positioned between the common bus and the alternative energy source.

The present apparatus can comprise one or more high frequency converters positioned between the common bus and the direct current connection systems.

Furthermore, in some embodiments, the present apparatus can comprise an energy accumulation system electrically connected to the common bus.

The accumulation system can comprise one or more accumulation devices connected to the common bus by means of a corresponding high frequency converter.

According to other aspects of the invention, the power supply system of the furnace can comprise a plurality of power supply modules comprising at least one medium voltage/medium voltage, or medium voltage/low voltage transformer, a rectifier connected to the transformer and a converter connected to the rectifier, wherein the direct current connection system is connected to each of the power supply modules between the rectifier and the converter.

The alternative energy source can comprise one or more renewable energy sources and/or one or more non-renewable energy sources able to supply direct current or alternating current electrical energy.

Some embodiments described here also concern an industrial plant, in particular a steel plant, comprising one or more lines for treating materials, including at least one of either a melting line and/or at least one rolling line, each comprising one or more user devices, and at least one electric power supply apparatus according to the invention.

The invention also concerns a method to supply electrical energy in a plant for treating metal material as defined above. The method provides to supply electrical energy to the one or more lines and/or to the one or more user devices by means of at least one alternative energy source, different from and independent of the mains power network.

This method provides to detect and/or monitor one or more parameters between the functioning status, the quality, the quantity and/or the cost of the electrical energy available from the mains power network and from the at least one alternative energy source, and the quantity of energy required by the one or more lines and/or by the one or more user devices and to select one, the other, or both in order to supply electrical energy to the one or more lines and/or to the one or more user devices at least as a function of the respective functioning status and overall energy costs.

BRIEF DESCRIPTION OF THE DRAWINGS

These and other aspects, characteristics and advantages of the present invention will become apparent from the following description of some embodiments, given as a non-restrictive example with reference to the attached drawing wherein:

FIG. 1 is a diagram of an electric power supply apparatus in a plant for treating materials according to the present invention.

DETAILED DESCRIPTION OF SOME EMBODIMENTS

We will now refer in detail to one possible embodiment of the invention, of which one example applied to a steel plant is shown in the attached drawing. This example is supplied by way of a non-limiting example of the invention and shall not be understood as a limitation thereof.

FIG. 1 schematically shows an electric power supply apparatus 10 for an industrial plant 20 for treating materials, according to the present invention.

The plant 20 comprises one or more lines 11, 21 for treating materials and one or more user devices 12, 17, 18, 19 powered in alternating current by power supply means 13 of the apparatus 10, which comprise at least one transformer 14 connected to a mains power network 15 and a power supply system 16 located downstream of the transformer 14.

In the present apparatus 10, the power supply means 13 also comprise at least one alternative energy source 40 provided upstream of the power supply system 16 and able to supply power energy to the one or more lines 11, 21 for treating the materials and/or to the one or more user devices 12, 17, 18, 19 in addition, or as an alternative, to the electrical energy supplied by the mains power network 15, in particular a public mains power network 15.

The plant 20 could be, by way of a non-limiting example, an industrial plant for treating metal material, for example a steel mill.

The plant can comprise at least one line 11 for melting metal material and at least one rolling line 21 for rolling the metal material produced by the melting line 11. The melting line 11 is provided with at least one user device, in particular a furnace 12 for melting metal material. The line 21 for rolling the metal material is provided with one or more user devices 17, 18, 19 electrically powered by the power supply means 13.

The molten metal material produced by the melting line 11 can be transferred to the rolling line 21 for example by means of a continuous casting process.

The alternative energy source 40 can be connected to the melting furnace 12, for example an electric arc furnace or an induction melting furnace, by means of at least one direct current connection system 22 connected to the power supply system 16, in particular located upstream of the power supply system 16 in the direction of the electric current toward the furnace 12. The direct current connection system 22 can be for example a so-called DC Link or suchlike.

The alternative energy source 40 can also be connected to the one or more user devices 17, 18, 19 of the rolling line 21 by means of at least one direct current connection system 23. The direct current connection system 23 can be for example a so-called DC Link or suchlike.

In some embodiments, these direct current connection systems 22 and 23 located respectively between the alternative energy source 40 and the melting furnace 12 and between the alternative energy source 40 and the user devices 17, 18, 19 of the rolling line 21 are associated with at least one common direct current connection line or bus 24.

The alternative energy source 40 can comprise one or more renewable energy sources 25 and/or one or more non-renewable energy sources 26 able to supply direct current or alternating current electrical energy.

With regard to the renewable energy sources 25, various technologies can be provided in this context, linked both to climatic/environmental parameters (sun, wind, hydrogeological morphology, etc.) and also to the availability of other forms of energy obtainable through transformation (e.g., biomass, hydrogen, vegetable oil, etc.). These renewable energy sources 25 can therefore comprise for example a hydroelectric plant, a wind power plant, a photovoltaic solar plant or other.

The alternative energy source 40 can be a non-renewable energy source 26, for example deriving from the combustion of fossil fuels, such as oil, coal, or gas.

In order to obtain the maximum use of the energy produced by the alternative energy source 40 provided, regardless of the solution adopted, it is preferable to create a common bus 24, to which all types of renewable 25 and/or non-renewable energy sources 26 which it has been decided will be used are connected, and from which the various direct current connection systems 22 and 23 which are connected to the common bus 24 can draw power.

The provision of at least one common bus 24 therefore allows to connect several direct current power supply systems substantially to a single collector, which can also be advantageous for compensating load variations, reducing the phenomena resulting from possible rapid variations in the power supply voltage and other.

The direct current flowing in the common bus 24, shared by the various renewable or non-renewable energy sources 25, 26, is then distributed and suitably reconverted into alternating current on the site of the end user, therefore for example the furnace 12, the user devices 17, 18, 19 or other.

The common bus 24 is substantially defined with a nominal value of direct voltage and a certain range of variation with respect to the nominal, linked to the variations of the rectified alternating current network.

This value may not be suitable for all loads connected to the common bus 24, for example the furnace 12, the user devices 17, 18, 19 or others, so in these cases it is necessary to adapt the direct voltage of the different existing direct current connection systems 22, 23 to the value of the voltage of the common bus 24.

The user device 17 can be, for example, an induction furnace for heating the metal material along the rolling line 21. The user devices 18 and 19, on the other hand, can be, for example, the means for driving the rollers of the rolling stands for rolling the metal material. The user devices could also comprise other elements, for example elements associated with the rollerways along which the metal product being rolled flows, and which are normally provided in the rolling line 21, or others.

In order to allow voltage adaptation, one or more high frequency converters 27 are provided, in particular DC/DC converters, positioned between the common bus 24 and the alternative energy source 40.

By high frequency we mean the switching frequency of the switching devices; the converters 27 can be of the step-up/step-down type: the direct current voltage at input, generated for example by a renewable energy source 25 such as photovoltaic or wind power, is raised or lowered at output from the converter 27, based on the voltage of the common bus 24.

A diagram of the converter 27 to be used could have a buck stage, a boost stage and a HF (High Frequency) transformer which guarantees the galvanic isolation between input and output; since there are multiple converters 27 connected on the same common bus 24, galvanic isolation may be necessary to prevent that, in the event of a failure of a converter, this propagates and blocks the user component or device, for example the furnace 12 of the melting line 11.

The same type of conversion can be provided in order to connect the common bus 24 to the different direct current connection systems 22, 23 connected to the loads present in the plant 20.

Therefore, the present apparatus 10 can comprise one or more high frequency converters 28, where galvanic isolation is necessary for the reasons already described for the converter 27, positioned between the common bus 24 and the direct current connection systems 22, 23.

The present apparatus 10 can comprise an energy accumulation system 29 electrically connected to the common bus 24.

The accumulation system 29 can comprise one or more accumulation devices connected to the common bus 24 by means of a corresponding high-frequency converter 31.

The accumulation system 29 can be useful, for example, in compensating for the discontinuity typical of the renewable energy sources 25 that are used, for example photovoltaic or wind power plants.

The accumulation system 29 can be static, therefore comprising accumulation devices 30 such as batteries, fuel cells, supercapacitors or other. Alternatively, or in combination, the accumulation system 29 can be dynamic, thus comprising accumulation devices 30 such as FES (Flywheel Energy Accumulation) batteries, turbogenerators powered by renewable fuels such as palm oil, turbines for mini-hydroelectric or other. The accumulation system 29 can be chemical, for example by means of systems for producing hydrogen by electrolysis, gas compression, hydrogen fuel cells or other.

The furnace 12, for example, will not always be in operation, therefore the surplus of energy in the period in which it is idle can be accumulated by means of one of the accumulation system 29 modes described above.

In the event the accumulation system 29 is provided in the apparatus 10, the converters 27, 28 have to be of the bi-directional type, that is, capable of both transferring energy to the load and also of recharging the accumulation system 29 when this falls below a minimum voltage threshold; if accumulation batteries are used, a BMS (Battery Monitoring System) management system can be integrated in the accumulation system.

In the event, for example, a photovoltaic plant is used as a renewable energy source 25, on the other hand, the converter 27, that is, the converter located on the side of the renewable energy source 25, has to optimize the production of energy always looking for the optimum working point.

The choice of one accumulation system over another depends on the type of application, based on the fact that it requires high power for a short period rather than a lower power but for long periods, therefore a much greater energy.

In the first case, typically supercapacitors are applied, but not only, in the second case, typically flywheel batteries, batteries or other accumulation systems with high energy density are applied, but not only. There are also applications that require a combination of the different solutions, where it is possible to have both delivery of high power for short periods and also a decidedly lower average energy value during the operating cycle.

With regards to the batteries, the power and energy density can vary considerably according to the technology to be adopted, for example AGM, Li-ion, Na—Ni, NaCl—Na or other.

Additional accumulation systems can also be used, such as gas compression in natural caverns, concentrated photovoltaics, or others.

With regards to the melting line 11, the power supply system 16 of the furnace 12 can comprise at least one power supply module 32 comprising a medium voltage/medium voltage, or medium voltage/low voltage transformer 33, a rectifier 34 connected to the transformer 33 and a converter 35 connected to the rectifier 34 by means of a direct current intermediate connection circuit 42, or DC-link, able to accumulate and filter the electrical energy and able to guarantee a better reliability and quality of the power supply to the converter. The intermediate connection circuit 42 can comprise one or more capacitor devices able to create a separation between the load, that is, the furnace 12 and the mains power network 15.

According to some embodiments, the power supply system 16 can comprise a plurality of power supply modules 32. Each of the power supply modules 32 comprises at least one medium voltage/medium voltage, or medium voltage/low voltage transformer 33, a rectifier 34 connected to the transformer 33 and a converter 35 connected to the rectifier 34 by means of a respective intermediate connection circuit 42.

In accordance with one possible solution, the rectifiers 34 comprise devices, for example selected from a group comprising Diodes, SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor) and IGBT (Insulated-Gate Bipolar Transistor), SiC (Silicon Carbide Semiconductor), GaN (Gallium Nitride Semiconductor).

In accordance with one possible solution, the converters 35 comprise devices selected, for example, from a group comprising SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor), and IGBT (Insulated-Gate Bipolar Transistor), SiC (Silicon Carbide Semiconductor), GaN (Gallium Nitride Semiconductor).

The direct current connection system 22 is connected to each of the power supply modules 32 between the rectifier 34 and the converter 35, in particular to a respective intermediate connection circuit 42.

Upstream of the melting furnace 12 there is also provided a high current circuit 36, which can be preceded by disconnectors 37 for possible electrical disconnection.

The melting furnace 12, as mentioned, can be an electric arc furnace comprising a plurality of electrodes 38, each of which can be electrically powered by a corresponding power supply module 32. The metal material M to be melted can be contained inside a corresponding container 39 or shell. The electrodes 38 are configured to strike an electric arc through the metal material M and melt it.

The present apparatus 10 can also comprise a management unit 41 configured to monitor one or more parameters between the functioning status, the quality, the quantity and/or the cost of the electrical energy available from the mains power network 15 and from the at least one alternative energy source 40, and the quantity of energy required by the one or more lines 11, 21 and/or by the one or more user devices 17, 18, 19, for example by the melting line 11 and/or by the rolling line 21 and to select one, the other, or both in order to supply electrical energy to the melting line 11 and/or to the rolling line 21 at least as a function of the respective functioning status and overall energy costs.

The accumulation system 29 can also be connected to the management unit 41. In particular, the various accumulation devices 30 can be connected to the management unit 41.

Some embodiments described here also concern an industrial plant 20, in particular a steel plant, comprising one or more lines for treating materials, including at least one of either a melting line 11 and/or at least one rolling line 21, each comprising one or more user devices 12, 17, 18, 19, and at least one electric power supply apparatus 10 according to the invention.

Substantially, the present method to supply electrical energy provides to supply electrical energy to the one or more lines 11, 21 and/or to the one or more user devices 17, 18, 19, by means of at least one alternative energy source 40, different from and independent of the mains power network 15.

The present method can also provide to detect and/or monitor one or more parameters between the functioning status, the quality, the quantity and/or the cost of the electrical energy available from the mains power network 15 and from the at least one alternative energy source 40, and the quantity of energy required by the one or more lines 11, 21 and/or by the user devices 17, 18, 19 and select one, the other, or both in order to supply electrical energy to the one or more lines 11, 21 and/or to the user devices 17, 18, 19 at least as a function of the respective functioning status and overall energy costs.

It is clear that modifications and/or additions of parts or steps may be made to the electric power supply apparatus for a plant for treating materials or to the method to supply electrical energy as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. An electric power supply apparatus for an industrial steel plant for treating materials, wherein said plant comprises lines for treating materials and user devices powered with alternating current by power supply means of said apparatus comprising at least one transformer connected to a public mains power network and a power supply system located downstream of said transformer,
   wherein said power supply means also comprise an alternative energy source connected to said power supply system and able to supply power energy to said lines for treating materials and/or to said user devices in addition, or as an alternative, to the electrical energy supplied by said mains power network, said apparatus comprises a management unit configured to monitor parameters between the functioning status, the quality, the quantity and/or the cost of the electrical energy available from said mains power network and from said alternative energy source, and the quantity of energy required by said lines and/or by said user devices and select one, the other, or both of said mains power network and alternative energy source to supply electrical energy to said lines and/or to said user devices as a function of the respective functioning status and of the overall energy costs,
   wherein said steel plant comprises a line for melting metal material and a rolling line, wherein said melting line is provided with a furnace and said rolling line is provided with said user devices,
   wherein said alternative energy source is connected to said furnace by means of one direct current connection system connected to said intermediate connection circuit of said power supply system, and
   wherein said power supply system of the furnace comprises a plurality of power supply modules comprising a medium voltage/medium voltage, or medium voltage/low voltage transformer, a rectifier connected to said transformer and a converter connected to said rectifier by means of a direct current intermediate connection circuit, or DC-link, said direct current connection system being connected to each of said power supply modules in said intermediate connection circuit between the rectifier and the converter.

2. The apparatus as in claim 1, wherein said alternative energy source is connected to said user devices of said rolling line by means of a direct current connection system.

3. The apparatus as in claim 2, wherein said direct current connection systems, located respectively between said alternative energy source and said furnace and between said alternative energy source and said user devices of the rolling line, are associated with a direct current common connection bus.

4. The apparatus as in claim 3, further comprising a high frequency converter positioned between said common bus and said alternative energy source.

5. The apparatus as in claim 3, further comprising a high frequency converters positioned between said common bus and said direct current connection systems.

6. The apparatus as in claim 3, further comprising an energy accumulation system electrically connected to said common bus.

7. The apparatus as in claim 6, wherein said accumulation system comprises an accumulation devices connected to the common bus by means of a corresponding high frequency converter.

8. The apparatus as in claim 1, wherein said alternative energy source comprises a renewable energy source and/or a non-renewable energy sources able to supply electrical energy in direct current or alternating current.

9. An industrial steel plant for treating materials comprising a line for treating materials and user devices powered in alternating current and an electric power supply apparatus as in claim 1.

10. Method to supply electrical energy in an industrial steel plant for treating materials, comprising a line for treating the materials and user devices powered in alternating current by power supply means comprising a transformer connected to a mains power network and a power supply system located downstream of said transformer, said method comprising providing to
   supplying electrical energy to said line and/or to said user devices, by means of an alternative energy source, different and independent from said mains power network; and
   detecting and/or monitoring parameters between the functioning status, the quality, the quantity and/or the cost of the electrical energy available from said mains power network and from said alternative energy source, and the quantity of energy required by said line and/or by said user devices and selecting one, the other, or both in order to supply electrical energy to said one or more lines and/or to said user devices as a function of the respective functioning status and the overall energy costs, wherein said steel plant comprises a line for melting metal material and a rolling line, wherein said melting line is provided with a furnace and said rolling line is provided with said user devices, wherein said alternative energy source is connected to said furnace by means of one direct current connection system connected to said intermediate connection circuit of said power supply system, and wherein said power supply system of the furnace comprises a plurality of power supply modules comprising a medium voltage/medium voltage, or medium voltage/low voltage transformer, a rectifier connected to said transformer and a converter connected to said rectifier by means of a direct current intermediate connection circuit, or DC-link, said direct current connection system being connected to each of said power supply modules in said intermediate connection circuit between the rectifier and the converter.

\* \* \* \* \*